Patented Feb. 17, 1948

2,436,362

UNITED STATES PATENT OFFICE 2,436,362

AMINOPHTHALIMIDES

Harold T. Lacey, Plainfield, and Robert E. Brouillard, Somerville, N. J., assignors to American Cyanamid Company, New York, N. Y., a corporation of Maine No Drawing. Application August 3, 1944,
Serial No. 547,987

5 Claims. (Cl. 260—326)

This invention relates to a new series of substituted aminophthalimides, to processes of coloring therewith and to products so colored. These new compounds are strongly fluorescent and thereby adapted to a number of different uses.

In recent years fluorescent compounds have attained considerable importance in advertising, decorations, exhibitions and in stage work. They have been variously used for blackout signs, on billboards, in plastics on the instrument panels of airplanes, for identification marks on vehicles and for other similar purposes.

They have found use in such widely divergent operations as being admixed with fertilizer to show distribution through soil; to show the penetration of biological fluids in bacteria; to show distribution of oil in leather and water-proofing compounds on concrete; to detect flaws in metal; to locate sources of water seepage in mines and oil wells; to accelerate the bleaching of oils by ultra-violet light; to accelerate the sterilization of fruit juices by ultra-violet light; in face creams to screen out harmful ultra-violet rays.

There is therefore an increasing demand for fluorescent materials which are readily produced from available materials and which have enhanced fluorescent properties. It is a principal object of the present invention to provide a new group of fluorescent materials which are readily produced, fluoresce strongly and are adapted for many purposes. It is also a further object of the invention to produce fluorescent materials which are particularly useful in the dyeing of artificial fibers and the natural vegetable and animal fibers to produce new and improved shades and effect.

More specifically, the invention relates to substituted aminophthalimides of the general formula:

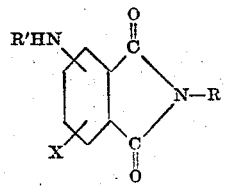

R is an alkylol radical, R' is hydrogen, an alkyl, or an alkylol radical, and X is either hydrogen or a halogen.

It will be noted from the above general formula that R may be alkylol and R' may be alkyl or alkylol radicals. The range of equivalents from which these radicals may be selected is wide. For example, the alkyl radicals may be methyl, ethyl, propyl, butyl, and the like. The alkylol radicals may be such hydroxyalkyl groups as methylol, ethylol, and the like.

The fluorescent materials of the present invention may be prepared by any suitable method. One such procedure is to prepare a salt of suitable phthalimide and treat the latter with a halide of the radical which is to be attached to the imide nitrogen. At the same time, or subsequently thereto, the substituent may be added to the other nitrogen of an aminophthalimide or a halophthalic acid may be treated with an alkylolamine to form an acid amide and an alkylolamine linkage and the product may be treated to close the imide.

Perhaps the simplest method in operation, and the most economical to carry out, is the preferred method in which a nitrophthalic acid is condensed with an aminoalcohol and the resultant amide is heated sufficiently to be dehydrated to the nitroimide, the nitro group of which can then be reduced by any known method. The imide so produced may then be treated to substitute in the amino group.

The invention will be more fully illustrated in conjunction with the following examples which are to be taken as illustrative only and not by way of limitation. All parts are by weight unless otherwise noted.

EXAMPLE 1

*3-ethylolaminophthalethylolimide*

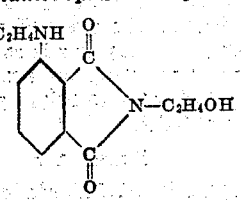

5 parts of 3-bromophthalic acid and 50 parts of monoethanolamine are refluxed for four hours, or until reaction is complete. The resultant mixture comprises the 3-ethylolaminophthalethylolimide in an excess of monoethanolamine. The latter is removed by fractional distillation. The resultant product is a yellow-brown oil which fluoresces orange in ethyl alcohol solution and green when dissolved in acetone or hydrocarbon solvents.

EXAMPLE 2

A bath is prepared containing 2 parts of 3-ethylolaminophthalethylolimide, obtained as in Example 1, 20 parts of sodium chloride, one-quarter part of lauryl sulfate, and one-quarter part of sodium pyrophosphate in 3500 parts of water. This bath is heated to 180° F. and 100 parts of cellulose acetate are treated therein for one hour. The resultant dyeing is reddish-yellow in daylight and orange in ultra-violet light.

EXAMPLE 3

3-n-heptylaminophthalethylolimide

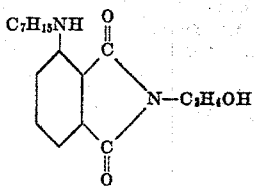

53 parts of 3-nitrophthalic acid is slurried in 50 parts of water and 16.8 parts of monoethanolamine is added. An exothermic reaction results and the temperature of the mixture goes up to about 60° C. The reaction mixture is then heated to 160–165° C. until all evolution of water has ceased and for 30 minutes longer. The mixture is then cooled to 70° C. and diluted with 100 parts of alcohol and stirred until homogeneous. This mixture, containing the nitrophthalethylolamide, is then added slowly to a previously boiled and cooled mixture of 94.4 parts of iron borings, 2 parts of 5 N-hydrochloric acid and 125 parts of water. The addition requires about 30 minutes. The mixture is then refluxed for one hour after which the alcohol is removed by distillation, and water is added to restore the original volume. The iron slurry is filtered hot and the resultant presscake washed with 25 parts of water at 95° C. The filtrate is cooled to 15–20° C. with stirring to precipitate the 3-aminophthalethylolimide which is then removed from the slurry by filtration. 4.12 parts of dried 3-aminophthalethylolimide, so prepared, 2 parts of pyridine and 4 parts of n-heptyl bromide are dissolved in 100 parts of ortho-dichlorobenzene and the solution refluxed for four hours. The solvent is then removed by steam distillation and the resulting 3-n-heptylaminophthalethylolimide separated from the aqueous layer. The product thus obtained is an amber oil which fluoresces yellow-green in alcohol and bluish-green in acetone, benzene and mineral oil.

EXAMPLE 4

A bath similar to that of Example 2 is prepared, substituting the dyestuff of Example 3 for that of Example 1. Dyeing is carried out on cellulose acetate producing an even yellow tint in daylight which fluoresces bright yellow-green under ultra-violet light.

EXAMPLE 5

3-heptylaminophthaloctadecenylimide

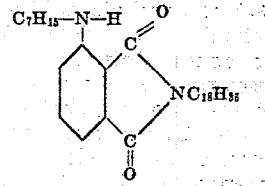

10.5 parts of 3-nitrophthalic acid is slurried in 25 parts of alcohol and 14 parts of 9-octodecenyl-amine-1 added thereto. An exothermic reaction results and the temperature of the mixture rises to 80° C. The alcohol is then boiled off and the residue heated for 30 minutes at 150° C. The crude 3-nitrophthaloctadecenylimide thus produced is purified by recrystallization from alcohol. 9.4 parts of recrystallized 3-nitrophthaloctadecenylimide is dissolved in 200 parts of alcohol and the solution added to a previously boiled and cooled slurry of 10 parts of iron borings, 0.2 part of 5 N-hydrochloric acid and 25 parts of water. The mixture is refluxed for 1½ hours, filtered hot, and the filtrate cooled to precipitate the 3-aminophthaloctadecenylimide. A mixture consisting of 4.1 parts of 3-aminophthaloctadecenylimide, 1.6 parts of heptylbromide, 1.5 parts of pyridine, and 50 parts of orthodichlorobenzene is refluxed for 4 hours. The solvent is then removed by steam distillation and the 3-heptylaminophthaloctadecenylimide separated from the aqueous layer. The product thus obtained is an amber oily solid which fluoresces yellow-green in alcohol and blue in acetone, benzene and mineral oil.

EXAMPLE 6

3-chloro-6-ethylolaminophthalethylolimide

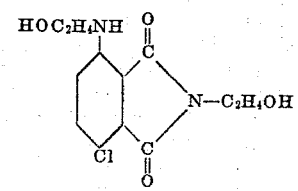

5 parts of 3,6-dichlorophthalic anhydride and 50 parts of monoethanolamine are refluxed for 6 hours. The excess monoethanolamine is removed by distillation and the resulting 3-chloro-6-ethylolaminophthalethylolimide purified by recrystallization from alcohol. After two crystallizations from alcohol the orange amorphous solid melts at 168–170° C. It fluoresces bright orange in alcohol.

EXAMPLE 7

A dye bath prepared according to Example 2 is made, using the dyestuff which was prepared in Example 6. The resultant dye is a level orange both in daylight and in ultra-violet light.

We claim:

1. As a new composition of matter an aminophthalimide of the general formula

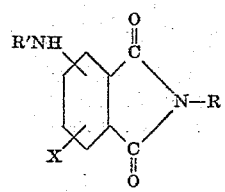

in which R is an alkylol radical, R' is selected from the group consisting of unsubstituted and hydroxyl substituted alkyl radicals and X is a member selected from the group consisting of hydrogen and halogen atoms.

2. As a new composition of matter an alkylolamino-N-alkylolphthalimide.

3. As a new composition of matter 3-ethylolaminophthalethylolimide.

4. As a new composition of matter 3-n-heptylaminophthalethylolimide.

5. As a new position of matter 3-chloro-6-ethylolaminophthalethylolimide.

HAROLD T. LACEY.
ROBERT E. BROUILLARD.

REFERENCES CITED

The following references are of record in the file of this patent:

UNITED STATES PATENTS

| Number | Name | Date |
| --- | --- | --- |
| 621,319 | Bredt | Mar. 21, 1899 |
| 1,618,415 | Ellis | Feb. 22, 1927 |
| 1,836,529 | Eckert | Dec. 15, 1931 |

OTHER REFERENCES

Beilstein, 4th edition, vol. 22, page 534 (1935).
Beilstein, 4th edition—second supplement, vol. 22, page 668 (1935).